US 9,758,119 B2

(12) United States Patent
Maier

(10) Patent No.: US 9,758,119 B2
(45) Date of Patent: Sep. 12, 2017

(54) GRILLE FOR A MOTOR VEHICLE FRONT PART

(71) Applicant: Daimler AG, Stuttgart (DE)

(72) Inventor: Hans-Peter Maier, Nagold (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/030,017

(22) PCT Filed: Sep. 27, 2014

(86) PCT No.: PCT/EP2014/002625
§ 371 (c)(1),
(2) Date: Apr. 15, 2016

(87) PCT Pub. No.: WO2015/055278
PCT Pub. Date: Apr. 23, 2015

(65) Prior Publication Data
US 2016/0280169 A1    Sep. 29, 2016

(30) Foreign Application Priority Data

Oct. 16, 2013   (DE) .................. 10 2013 017 131

(51) Int. Cl.
*B60R 19/52*    (2006.01)

(52) U.S. Cl.
CPC ........ *B60R 19/52* (2013.01); *B60R 2019/525* (2013.01); *B60Y 2304/05* (2013.01)

(58) Field of Classification Search
CPC ... B60R 19/52; B60R 2019/525; B60K 11/08; B60Y 2304/05
USPC ..................... 296/193.1; D12/163, 171, 216
See application file for complete search history.

(56) References Cited

U.S. PATENT DOCUMENTS

| D184,109 | S | * | 12/1958 | Mueller | ........................ D12/163 |
| D185,252 | S | * | 5/1959 | Wozena | ........................ D12/163 |
| D190,277 | S | * | 5/1961 | Walker | ........................ D12/163 |
| D515,474 | S | * | 2/2006 | Wu | ........................... D12/163 |
| D526,943 | S | * | 8/2006 | Wu | ........................... D12/163 |

(Continued)

FOREIGN PATENT DOCUMENTS

| DE | 40 01 447 C1 | 12/1990 |
| DE | 201 10 745 U1 | 12/2001 |

(Continued)

OTHER PUBLICATIONS

PCT/EP2014/002625, International Search Report (PCT/ISA/220 and PCT/ISA/210) dated Dec. 4, 2014, with partial English translation, enclosing Written Opinion of the International Searching Authority (PCT/ISA/237) (Eleven (11) pages).

(Continued)

*Primary Examiner* — Gregory Blankenship
(74) *Attorney, Agent, or Firm* — Crowell & Moring LLP

(57) ABSTRACT

An ornamental grille for a motor vehicle front part is disclosed. The ornamental grille has a plurality of ornamental elements which respectively include an ornamental element end wall and an ornamental element side wall protruding from this and has a plurality of connecting elements via which adjacent ornamental elements are connected to one another respectively. The ornamental elements are arranged in rows and the ornamental elements of one row are laterally offset from the ornamental elements of the adjacently arranged row of ornamental elements.

8 Claims, 2 Drawing Sheets

(56) References Cited

U.S. PATENT DOCUMENTS

| | | | |
|---|---|---|---|
| D560,570 S * | 1/2008 | Rester | D12/163 |
| D575,688 S * | 8/2008 | Miyata | D12/163 |
| D602,820 S * | 10/2009 | Yukawa | D12/163 |
| D615,007 S * | 5/2010 | Kasai | D12/163 |
| D619,055 S * | 7/2010 | Walters | D12/163 |
| D623,565 S * | 9/2010 | Cogswell | D12/163 |
| D624,467 S * | 9/2010 | Pezzini | D12/163 |
| D650,725 S * | 12/2011 | Tonello | D12/163 |
| 8,348,312 B2 * | 1/2013 | Bailey | B60K 11/08 180/68.6 |
| D678,135 S * | 3/2013 | Behmer | D12/163 |
| D678,136 S * | 3/2013 | Behmer | D12/163 |
| D680,033 S * | 4/2013 | Behmer | D12/163 |
| D687,354 S * | 8/2013 | Hildebrand | D12/163 |
| D695,159 S * | 12/2013 | Hildebrand | D12/163 |
| D702,155 S * | 4/2014 | Hanaoka | D12/163 |
| D712,321 S * | 9/2014 | Mays | D12/163 |
| D716,706 S * | 11/2014 | Thole | D12/163 |
| D722,927 S * | 2/2015 | Schroeder | D12/171 |
| D758,926 S * | 6/2016 | Rupar | D12/163 |
| D769,779 S * | 10/2016 | Woodhouse | D12/163 |
| D774,996 S * | 12/2016 | Wheel | D12/163 |
| D774,997 S * | 12/2016 | Wheel | D12/163 |
| D775,554 S * | 1/2017 | Kapitonov | D12/163 |
| 2003/0000753 A1 | 1/2003 | Shih | |
| 2007/0182174 A1 | 8/2007 | Nakayama et al. | |
| 2011/0204680 A1 * | 8/2011 | Fortin | B60R 19/18 296/193.1 |
| 2015/0028605 A1 | 1/2015 | Maier et al. | |
| 2016/0280169 A1 * | 9/2016 | Maier | B60R 19/52 |

FOREIGN PATENT DOCUMENTS

| | | |
|---|---|---|
| DE | 10 2006 060 846 A1 | 6/2008 |
| DE | 10 2012 013 699 A1 | 9/2013 |
| EP | 2 733 020 A1 | 5/2014 |

OTHER PUBLICATIONS

German-language Office Action issued in German counterpart application No. 10 2013 017 131.8 dated Jun. 4, 2014 (Five (5) pages).

Japanese Office Action issued in Japanese counterpart application No. 2016-522796 dated Apr. 4, 2017, with partial English translation (Five (5) pages).

* cited by examiner

GRILLE FOR A MOTOR VEHICLE FRONT PART

BACKGROUND AND SUMMARY OF THE INVENTION

The invention relates to an ornamental grille for a motor vehicle front part.

Ornamental grilles are also referred to as radiator grilles and generally serve for the covering of an inlet port on the motor vehicle front part, behind which inlet port the engine radiator is arranged, at least in the case of motor vehicles with a front engine and a water cooling system. In this case, one-piece or, however, also multi-piece ornamental grilles are used, which are then, for example, arranged around a badge and fixed on a corresponding holding frame.

An ornamental grille for motor vehicles arises from DE 40 01 447 C1 which is to be arranged in the front region of the motor vehicle and has longitudinal and transverse slats arranged in a grid-like manner, which are formed in such a way that the airstream flowing through is directed in a desired manner and partially desired pressure ratios in the air flow appear.

The object of the present invention is to create an alternative ornamental grille for a motor vehicle front part which can be produced in a simple and cost-effective manner.

The ornamental grille has a plurality of ornamental elements which each comprise an ornamental element end wall and an ornamental element side wall protruding from this. The ornamental elements are kept at a distance from one another by means of connecting elements, via which adjacent ornamental elements are connected to one another respectively. Here, the ornamental elements are arranged in rows, wherein the ornamental elements of one row are laterally offset from the ornamental elements of the adjacently arranged row of ornamental elements.

In an advantageous exemplary embodiment of the ornamental grille, it is provided that the ornamental elements have a trough-shaped basic contour, which is preferably rounded, meaning that the ornamental elements do not have any angular or sharp corners. By means of such an embodiment—as seen in a top view of the ornamental element end wall—the contour of a rod can be produced for the respective ornamental element.

According to one development of the ornamental grille, it is provided that the respective ornamental element has a respective, trough-like, circumferential ornamental element side wall which—according to one advantageous exemplary embodiment—is partially provided with an opening, a cut-out or similar open region. By means of this partially open formation of the respective ornamental element side wall, larger cores for corresponding molds can be used, in particular, which ensure a more simple mold temperature control and additionally enable the individual ornamental elements to be arranged at a shorter distance from one another. This enables the production of ornamental grilles with a filigree effect. Furthermore, the ornamental elements themselves can be sized to be smaller, since the respective cores for the formation of the associated ornamental elements no longer have to be restricted to the interior of this, but rather can be designed to be larger as a result of the open region within the respective ornamental element side wall. Furthermore, the number of cores can be reduced due to the open regions of the ornamental element side walls.

In a further embodiment of the invention, it has thereby been shown to be advantageous that the respective open region of the ornamental elements is provided in a longitudinal side of the allocated ornamental element side wall. Preferably, as seen in a top view of the ornamental element end wall, the open region is provided on the lower longitudinal side such that this is practically not recognizable by an observer of the installed ornamental grille and therefore the visual impression of the ornamental grille is not influenced in an undesired manner.

In a further embodiment of the invention, the connecting elements are connected to the longitudinal sides of the allocated ornamental element side walls, wherein the associated open region is provided, within the respective longitudinal side, between the respective connecting elements. As a result of this, cores in the respective mold for the production of the ornamental grille can be created, the cores enabling particularly small spacing between the respective ornamental elements.

In an advantageous embodiment of the invention, the open region extends up to the ornamental element end wall within the associated longitudinal side of the ornamental element side wall. In other words, the open region is designed according to the invention in such a way that, between this and the end wall, a wall region of the side wall is no longer present. As a result, an L-shaped cross section of the ornamental element results, which can be produced particularly simply by means of a core.

It is furthermore advantageous if the open region is provided in a respective lower longitudinal side of the ornamental element side wall. These open regions are therefore not recognizable by a person viewing the motor vehicle front part from the front.

A further advantageous embodiment provides that the ornamental elements are arranged to be offset from one another in a wall-like manner and are spaced apart from one another by means of the connecting elements. In particular, the air intake is thereby not negatively influenced and only a slightly larger degree of obstruction results.

A further advantageous embodiment provides that the open regions within the respective ornamental element side walls are formed as at least substantially trapezoidal recesses. A particularly favorable demolding of the ornamental grille therefore results after the production thereof.

Finally, it has been shown to be advantageous if, in a further embodiment of the invention, respective end faces of the connecting bridges and of the ornamental element side walls are arranged in a common plane. In this case, a particularly favorable mold separation and therefore production of the ornamental grille can be achieved.

A preferred exemplary embodiment of the ornamental grille is illustrated in greater detail below with the aid of the drawings.

BRIEF DESCRIPTION OF THE DRAWINGS

FIG. 2 is a partial sectional view through respective ornamental elements of the ornamental grille according to FIG. 1a along a sectional plane represented by the line II-II in FIG. 1a;

DETAILED DESCRIPTION OF THE DRAWINGS

Figure 1A:
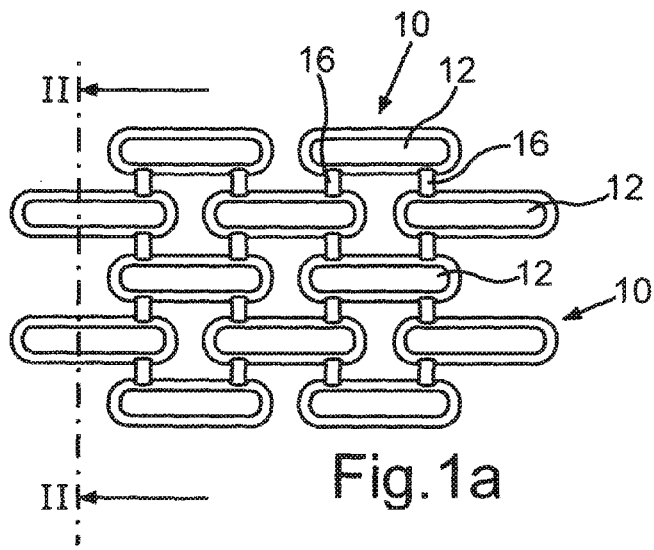
FIGS. 1a, 1b are a front view and a rear view, respectively, of the ornamental grille for a motor vehicle front part.
Figure 1B:
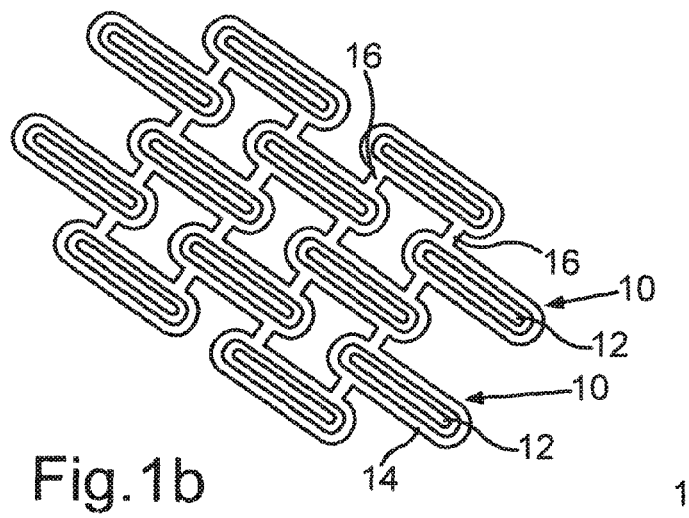

FIGS. 1a and 1b respectively show an ornamental grille for the front part/front region of a motor vehicle in a partial and perspective front view and rear view, the ornamental grille comprising a plurality of trough-like ornamental elements 10 which comprise a respective ornamental element end wall 12 and a respective ornamental element side wall 14 which protrudes from this in the vehicle longitudinal direction towards the rear. The respective ornamental element end wall 12 can thereby be provided with a coating, in particular a chrome-plated coating, on the front side, i.e., on the side facing away from the ornamental element side wall 14, for example, such that a plurality of ornamental element end walls 12 form a visually high-quality front side of the ornamental grille according to the front view depicted in FIG. 1a. The individual ornamental elements 10 are thereby connected to the respective adjacent ornamental elements 10 through the intermediary of respective connecting elements 16, and in such a way that the ornamental elements 10 are offset in the style of a brick wall and are thereby arranged to be spaced apart from one another.

Figure 2:
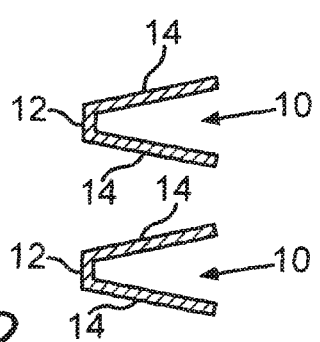

As is recognizable from FIG. 2 in particular, the respective ornamental element side wall 14 protruding towards the rear is arranged at a corresponding angle to the respective ornamental element end wall 12 and is formed to surround this completely.

The ornamental grille according to FIGS. 1a to 2, which consists at least substantially of plastic material, is relatively difficult to produce here, since a plurality of extremely small cores are required for the production of the respective trough-shaped ornamental elements 10 as well as the spaces between these elements. This can be problematic, in particular with respect to mold temperature control. Additionally, the respective ornamental elements can only be arranged with sufficient spacing from one another since a minimum spacing of the individual mold cores is required for the formation of the ornamental elements or the ornamental grille depending on the mold.

Figure 3A:
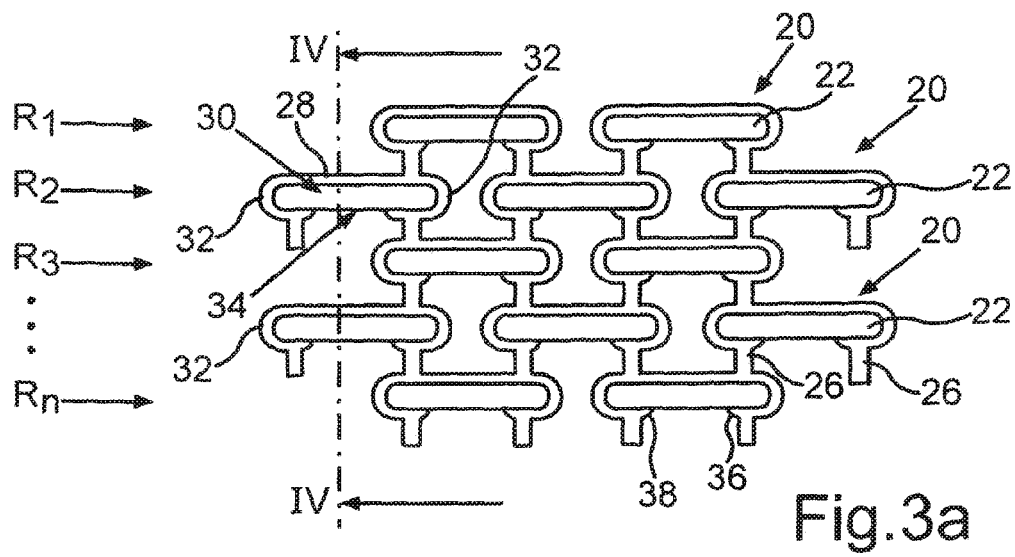
FIG. 3a, 3b are a partial front view as well as a partial, perspective rear view of an exemplary embodiment of the ornamental grille for a motor vehicle front part according to the invention, which has a plurality of ornamental elements which each comprise an ornamental element end wall and a respective ornamental element side wall which protrudes from this in the vehicle longitudinal direction towards the rear in the installed state of the ornamental grille, and having a plurality of connecting elements, via which respective adjacent ornamental elements are connected to one another, wherein the ornamental element side walls of the ornamental elements each have an open region.
Figure 3B:
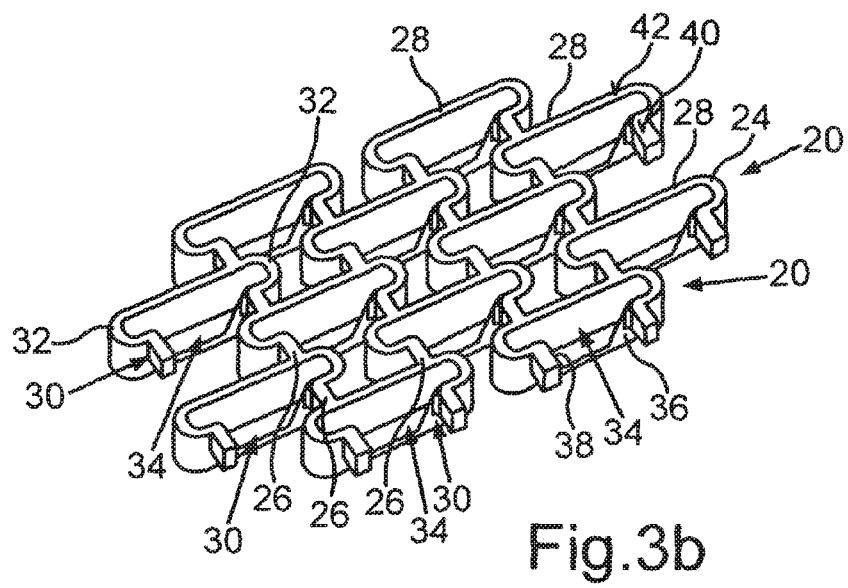
Figure 4:
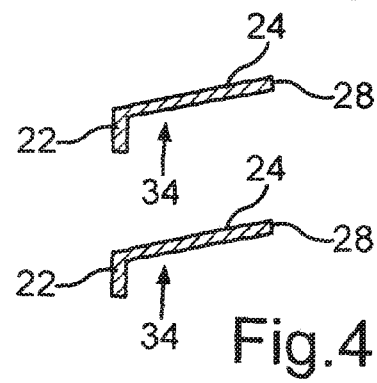
FIG. 4 is a partial sectional view through the ornamental grille along a sectional view through two ornamental elements of the ornamental grille, the sectional view being represented by the line IV-IV in FIG. 3a, running perpendicularly to a primary plane of the ornamental grille or in the vehicle longitudinal direction and in the vehicle vertical direction in the installed state.

FIGS. 3a to 4 show a further exemplary embodiment of the ornamental grille, which, by contrast with the ornamental grille according to FIGS. 1a to 2, is distinguished by the fact that it enables a closer placement/arrangement of the ornamental elements with respect to one another, depending on construction, and also enables a reduction in the width of the ornamental elements despite their trough-like design and production by means of temperature-controlled mold cores. As a result, the ornamental grille can be developed to have a filigree effect.

FIGS. 3a and 3b show, in a partial front view and a partial and perspective rear view, the ornamental grille for a vehicle front part having a plurality of ornamental elements 20 which have a substantially trough-shaped or pot-shaped spherical contour in the present case. This is formed by a respective ornamental element end wall 22 from which—as seen in the vehicle longitudinal direction—a respective ornamental element side wall 24 extends towards the rear. In the present case, the ornamental grille is produced completely from plastic, wherein the respective ornamental elements 20 are designed as one piece. Respective connecting elements 26 are likewise formed in one piece with the ornamental elements 20, via which respective adjacent ornamental elements 20 are connected to one another. The ornamental elements 20 are thereby offset in the style of a brick wall and arranged at a distance from one another, wherein the respective connecting elements 26 determine the distance of respective rows R1, R2, R3, Rn from the ornamental elements 20.

As is recognizable from FIG. 3a in particular, the respective ornamental element end walls 22 form a so-called rod-like appearance towards the front or towards the outer side of the vehicle front part, so a plurality of elongated strip-like elements which are connected to one another. The respective front sides of the ornamental element end walls 22 arranged on the side facing away from the ornamental element side walls 24 can thereby be provided with a coating or similar and can be chrome-plated in particular. The application of the coating can take place, for example and in particular, by means of hot stamping.

As is recognizable from FIG. 3b in particular, the trough-shaped ornamental elements 20 or the respective ornamental element side wall 24 thereof each have an upper longitudinal side 28 and a lower longitudinal side 30 which are connected to each other via arched wall regions 32 in each case. Upper and lower longitudinal sides 28, 30 here refers to the arrangement thereof in the installed state of the ornamental grille on the motor vehicle front part. The respective upper longitudinal side 28 therefore extends in the vehicle transverse direction or approximately horizontally in the respective upper region of the ornamental element 20, whereas the respective lower longitudinal side 30 also extends below this in the vehicle transverse direction and approximately horizontally. The respective connecting elements 26 are also arranged on the longitudinal sides 28, 30.

However, the respective lower longitudinal side 30 is formed with a respective open region 34 which is formed in the present case as a substantially trapezoidal recess between respective adjacent connecting elements 26 which are attached on the lower side to the lower longitudinal side 30 in each case. Therefore, only respective edge regions 36, 38 of the respective lower longitudinal side 30 remain, which are attached to the respective associated arched wall regions 32 of the respective ornamental element side wall 24 as well as to the respective laterally allocated connecting element 26.

As is recognizable from FIG. 4 in particular, which depicts a cross section through two of the ornamental elements 20 in a partial sectional view along a sectional plane represented by the line IV-IV in FIG. 3a, the respective open region 34 thereby extends downwards to the respective ornamental element end wall 22. In other words, only one substantially L-shaped cross section of the respective ornamental element 20 remains in the cross section in the region of the respective open region 34, wherein the lower longitudinal side 30 of the respective ornamental element side wall 24 is completely omitted in the open region 34.

By means of this omission of the respective ornamental element side wall 24 in the open region 34, it is possible to use a mold with larger stamps, as is possible, for example, in the case of the ornamental grille which is described by means of FIGS. 1a to 2. Stamps can hereby be used, in particular, which extend from the respective upper longitudinal side 28, for example, of the ornamental element 20 in a row R1 up to the upper longitudinal side 28 of the ornamental element 20 in a third row R3.

In particular, it is furthermore recognizable from FIG. 3*b* that respective end sides 40 of the connecting elements 26 and respective end sides 42 of the ornamental element side walls 24 are arranged in a common plane which runs in parallel to the plane formed by the ornamental element end walls 22. This enables a particularly favorable mould separation in the region of this plane.

Overall, it is therefore recognizable that, in the present case, an ornamental grille is created in which comparatively large cores can be used, which is beneficial for particularly favorable mold temperature control. Moreover, more filigree ornamental grilles having tighter spacing of the respective ornamental elements 20 are depicted. The air intake is thereby not negatively influenced and only a slightly larger degree of obstruction results.

The ornamental grille can thereby be designed to be completely in one piece and therefore cover the corresponding opening in the motor vehicle front part. Likewise, several ornamental grilles can also be put together and held on a frame, and for example surround a corresponding badge. The variant described in the present case therefore only describes the design of the flat form of the corresponding ornamental element.

The invention claimed is:

1. An ornamental grille for a motor vehicle front part, comprising:
   a plurality of ornamental elements which respectively include an ornamental element end wall and an ornamental element side wall that protrudes from the ornamental element end wall, wherein the ornamental element side wall has an open region which is disposed in a longitudinal side of the ornamental element side wall; and
   a plurality of connecting elements, wherein adjacent ornamental elements of the plurality of ornamental elements are connected to one another by a respective connecting element;
   wherein the plurality of ornamental elements are disposed in rows, wherein ornamental elements of a first row are laterally offset from ornamental elements of a second row, and wherein the second row is disposed adjacent to the first row.

2. The ornamental grille according to claim 1, wherein the plurality of ornamental elements have a substantially rounded trough-shaped basic contour.

3. The ornamental grille according to claim 1, wherein the respective connecting element is connected to respective longitudinal sides of the adjacent ornamental elements.

4. The ornamental grille according to claim 1, wherein the longitudinal side is a lower longitudinal side.

5. The ornamental grille according to claim 1, wherein the open region extends up to the ornamental element end wall within the longitudinal side of the ornamental element side wall.

6. The ornamental grille according to claim 1, wherein the open region is an at least substantially trapezoidal recess.

7. The ornamental grille according to claim 1, wherein the plurality of ornamental elements are laterally offset from one another in a wall-like manner and are spaced apart from one another by the plurality of connecting elements.

8. The ornamental grille according to claim 1, wherein respective end faces of the plurality of connecting elements and of the ornamental element side walls are arranged in a common plane.

\* \* \* \* \*